United States Patent
Kuvaja et al.

(10) Patent No.: US 12,473,228 B2
(45) Date of Patent: Nov. 18, 2025

(54) COATING FOR GLASS ARTICLES

(71) Applicant: Brightplus Oy, Oulu (FI)

(72) Inventors: Rauna-Leena Kuvaja, Oulu (FI); Heli Kummala, Oulu (FI); Jarkko Leivo, Oulu (FI)

(73) Assignee: Brightplus Oy, Oulu (FI)

(*) Notice: Subject to any disclaimer, the term of this patent is extended or adjusted under 35 U.S.C. 154(b) by 0 days.

(21) Appl. No.: 18/039,310

(22) PCT Filed: Nov. 29, 2021

(86) PCT No.: PCT/FI2021/050823
§ 371 (c)(1),
(2) Date: May 30, 2023

(87) PCT Pub. No.: WO2022/112662
PCT Pub. Date: Jun. 2, 2022

(65) Prior Publication Data
US 2024/0002284 A1    Jan. 4, 2024

(30) Foreign Application Priority Data
Nov. 30, 2020 (EP) .................................. 20397515

(51) Int. Cl.
*C03C 17/30* (2006.01)

(52) U.S. Cl.
CPC ........ *C03C 17/30* (2013.01); *C03C 2218/112* (2013.01)

(58) Field of Classification Search
CPC .................. C03C 17/30; C93C 2218/112
See application file for complete search history.

(56) References Cited

U.S. PATENT DOCUMENTS

| | | | |
|---|---|---|---|
| 5,567,235 A * | 10/1996 | Carson | C08J 7/0427 106/287.15 |
| 9,499,434 B1 | 11/2016 | Sharma et al. | |
| 2011/0003098 A1 | 1/2011 | Wen et al. | |
| 2014/0182337 A1 | 7/2014 | Sharma et al. | |
| 2015/0329727 A1* | 11/2015 | Lu | C23C 18/1262 428/447 |
| 2017/0335137 A1 | 11/2017 | Lew et al. | |

FOREIGN PATENT DOCUMENTS

| | | |
|---|---|---|
| EP | 0478154 A2 | 4/1992 |
| JP | S5497617 A | 8/1979 |
| JP | H04231354 A | 8/1992 |
| RU | SU504719 A1 | 2/1976 |
| WO | WO9119606 A1 | 12/1991 |
| WO | WO2012166221 A1 | 12/2012 |
| WO | WO2014105350 A2 | 7/2014 |
| WO | WO2017100512 A1 | 6/2017 |

* cited by examiner

*Primary Examiner* — Nathan T Leong
(74) *Attorney, Agent, or Firm* — Laine IP Oy

(57) ABSTRACT

The present invention concerns a method for forming a siloxane coating on a glass article. In addition, the invention concerns a glass article coated by such method and use of such glass article. In particular, the present invention concerns a method comprising applying and curing a coating composition on the surface of the glass article, wherein the coating composition comprises an alkoxysilane component and a liquid medium.

20 Claims, No Drawings

COATING FOR GLASS ARTICLES

BACKGROUND OF THE INVENTION

Field of the Invention

The present invention concerns a method for forming a siloxane coating on a glass article. In addition, the invention concerns a glass article coated by such method and use of such glass article.

Description of Related Art

In the conventional manufacture of glass containers, two surface coatings are typically applied to glass containers. Purpose of these surface treatments is to protect the containers from external damage during further processing and in use. A so called "hot-end coating" (HEC) is applied just before annealing typically at a temperature of from about 500° C. to 550° C.; and a "cold-end coating" (CEC) just after annealing, typically at a temperature of about 65° C. to 180° C.

The HEC material is applied at the hot end using atmospheric chemical vapour deposition (CVD). The common precursor used is monobutyltin trichloride (MBTC) which is an organometallic compound based on tin. The hot bottles are channeled through a purpose built hood chamber, wherein, under the elevated temperature, MBTC vaporises in the hood and then decomposes when it contacts the bottles as they pass through on the conveyer belt. Hydrochloric acid (HCl) and tin-oxide are byproducts of MBTC. The CEC typically consists of plastic micro-particles, most commonly partially oxidised polyethylene, which is spray-deposited from a dilute emulsion as a vapour. This reduces friction (makes the glass slippery), protecting it from scratching and stopping containers from sticking together when they are moved on a conveyor.

Materials used in the current glass manufacturing process as the hot-end coatings are toxic, damaging to the environment and harmful to factory workers. In addition, materials used in the cold-end coating are non-biodegradable, resulting in many thousands of tonnes of microplastic waste entering landfill and marine environments annually.

These issues have been tried to be solved in the prior art.

Patent publication WO2017100512A1 describes a coating of compounded polymer that includes a copolymer of an a-olefin and an b-unsaturated carboxylic acid and a wax. Coating may also include an adhesion promoter that can be silane.

A cross-linked hybrid sol-gel coating that may replace the hot end coating and the cold end coating is presented in patent publication WO2012166221A1. The coating composition of this invention contains a silane and an organic solvent. Whereas, patent publication WO2014105350A2 describes coating a glass container by applying an amino-functional silane coating composition to an exterior surface of the glass container, and then curing the silane coating composition to form a crosslinked siloxane coating. Other coating layers can be used over the amino-functional silane coating.

Accordingly, there is still need for sustainable microplastic and organic solvent free cold end coating, that may be applied to glass articles without a need of a hot end coating.

SUMMARY OF THE INVENTION

The present invention aims at solving at least some of the problems of the prior art.

It is an object of the present invention to provide a non-toxic and fully sustainable coating composition for coating of glass articles. In particular, it is an object of the present invention to provide a single step method for coating glass articles.

Thus, the present invention relates to a method for forming a new kind of siloxane coating on a glass article. The method comprises the steps of providing a coating composition, applying the coating composition on the surface of the glass article and curing the coating composition to form the siloxane coating on the glass article. Such method for coating glass articles can be seen as a single step process since the applying and curing of the coating composition are basically preferably performed in a single step since the coating composition is cured by the heat of the glass article being coated. Thus, there is no need for a separate curing step.

The coating composition of the present invention comprises an alkoxysilane component and a liquid medium, preferably an aqueous medium, such as water. Alkoxysilanes have the advantages of low viscosity, and high chemical stability, for example. Typically, the alkoxysilane concentration of the coating composition is 0.1 to 30 wt. % of the weight of the coating composition.

In addition, the present invention concerns a coated glass article obtained by the above described method and uses of such glass article.

In particular, the present invention is characterized by what is stated in the independent claims. Some specific embodiments are defined in the dependent claims.

Several advantages are reached using the present invention. Among others, the method of the invention provides a non-toxic and sustainable coating composition of glass articles. In particular, the method of the present invention replaces the two-step coating process in the glass manufacturing process by a one-step process, thereby eliminating a 'bottleneck' in the production process. Thus, the present invention enables coating of glass articles with only a single coating composition but still providing the required properties for the coating.

The method of the present invention can be performed in the cold end of the conventional glass manufacturing process with identical or similar system already in place. Thus, no changes in conventional production lines are needed. In addition, the present method removes the need for a spray hood at the hot end, which hood causes problems, such as breakages and environmental impact from toxic release, since hot end coating is not needed at all. The present method also provides significant improvements in linespeed and breakages, which has a large impact for high-volume industries that incurs most of its costs from energy consumption. Such savings have a direct impact on environmental goals.

Thus, the method of the present invention provides greater efficiency, while replacing toxic and non-biodegradable materials that are damaging to health and marine life.

EMBODIMENTS

The present invention relates to a method for forming a siloxane coating on a glass article. The siloxane coating of the present invention can improve mechanical strength of the glass article by filling-in any anomalies on the surface of the glass article and by preventing further creation of surface variation.

The method comprises the steps of providing a coating composition, applying a coating composition on the surface of the glass article and curing the coating composition to form the siloxane coating on the glass article.

According to a preferred embodiment the coating composition of the present invention comprises an alkoxysilane component and a liquid medium. The liquid medium preferably acts as a solvent in the coating composition. Thus, the coating composition of the present invention is preferably in a liquid form, i.e. a liquid as such, a solution or a dispersion. According to a preferred embodiment, the coating composition is an aqueous solution.

As already mentioned above, alkoxysilanes have the advantages of low viscosity, and high chemical stability, for example. It has been surprisingly found in the present invention that properties of alkoxysilanes can be utilized in the coatings of glass articles. Low viscosity makes it easy for alkoxysilanes to penetrate the glass pores in order to achieve a protective layer on glass surface. Meanwhile, the coating composition further treats the glass through alkoxy hydrolysis, i.e. hydroxyl groups or activated hydroxyl groups of the alkoxysilane component react with the hydroxyl groups of the glass forming hydrogen bonds. In addition, the hydrolytically produced silica can play a role as a bridge between inorganic particles, wherein neighboring particles are linked together by a silicon-oxygen chain. The bond energy of the Si—O bonds is large, and these bonds have a certain thermal stability, oxidation resistance and a good weathering ability.

According to one embodiment, the alkoxysilane component is formed of alkoxysilane monomers.

According to a further embodiment, the alkoxysilane component is preferably formed of alkoxysilane monomers in a hydrolyzation and condensation polymerization, wherein the obtained alkoxysilane component is a polysiloxane mixture.

According to a preferred embodiment the alkoxysilane component is obtained by hydrolyzation reaction in the presence of an aqueous medium, in particular water, preferably it is obtained by hydrolyzation and condensation polymerization of the alkoxysilane monomers in order to obtain a polymer having a siloxane backbone by repeating —Si—O—Si— units. In the hydrolyzation, for example possible ethoxy and methoxy groups of the alkoxysilane react to form hydroxyl (OH) groups, i.e. silanol, which can further react and form for example dimers and trimers with other siloxanes or silanols in the mixture. Thus, according to one embodiment, the coating composition can comprise the alkoxysilane component being in a form of a polysiloxane mixture comprising partially or completely condensed polysiloxane polymers. According to one embodiment, the alkoxysilane component is a polysiloxane mixture that can be comprised of alkoxysilane monomers, siloxane oligomers or polymers, or any mixture of these.

In the present context, the oligomers comprise 2 to 10 monomeric units and the polymers 11 monomeric units or more.

One or several different alkoxysilanes can be used in the present invention. For example, two different alkoxysilanes can be used.

According to one embodiment the alkoxysilane monomer is selected from the group of trimethoxymethylsilane (MTEOS), trimethoxymethylsilane (MTMS), ethoxytrimethylsilane (ETMS), 1,2-bis(triethoxysilyl)ethane (BTESE), tetraethyl ortosilicate (TEOS), triethoxyphenylsilane (PTMS), polydimethylsiloxane (PDMS), vinyltrimethylsilane (Vinyl-TMS), dimethyldiethoxysilane (DMDEOS), 3-glycidoxypropyl-trimethoxysilane (GPTMS), phenyltrimethoxysilane (PTMS) and mixtures thereof.

According to another embodiment the alkoxysilane monomer is selected from the group of triethoxysilane, ethyltriethoxysilane, methyltrimethoxysilane, methyltriethoxysilane, tetraethoxysilane, tetramethoxysilane, dimethyldiethoxysilane, dimethyldimethoxysilane, methyldiethoxyvinylsilane, 1,2-bis(triethoxysilyl)ethane, vinyltrimethoxysilane, vinyltriethoxysilane, vinylmethyldimethoxysilane, phenyltrimethoxysilane, n-butyltriethoxysilane, n-octadecyltriethoxysilane, acryloxypropyl-trimethoxysilane, allyltrimethoxysilane, methacryloxypropyltriethoxysilane, methacryloxypropyltrimethoxysilane, 3-glysidoxypropyltrimethoxysilane, 3-glycidoxypropylmethyldiethoxysilane, diphenylsilanediol, 1,2-bis(trimethoxysilyl)methane, 1,2-bis(trimethoxysilyl)ethane, epoxycyclohexylethyltrimethoxysilane, and mixtures thereof. These can be used alone, in combination with each other or together with the above-mentioned silane monomers.

According to one embodiment at least a part of the alkoxysilane monomers are monomers with a functional group. Preferably at least 50 mol-%, preferably at least 70 mol %, more preferably at least 90 mol %, of the monomers have a functional group.

According to one embodiment, at least 50 mol-%, preferably at least 70 mol %, more preferably at least 90 mol-%, suitably all of the alkoxysilane monomers are selected from the group of di- and trifunctional silanes comprising methyltriethoxysilane (MTEOS), trimethoxymethylsilane (MTMS), ethoxytrimethylsilane (ETMS), 1,2-bis(triethoxysilyl)ethane (BTESE), tetraethyl ortosilicate (TEOS), triethoxyphenylsilane (PTMS), polydimethylsiloxane (PDMS), vinyltrimethylsilane (Vinyl-TMS), and combinations thereof.

According to one embodiment, the alkoxysilane concentration of the coating composition is 0.1 to 30 wt. %, such as 0.2 to 20 wt. %, preferably 1 to 10 wt. %, for example 2-6 wt. %, calculated from the weight of the total coating composition.

According to one embodiment, after curing, the coating composition consists essentially only of siloxane polymer; i.e. the liquid medium, preferably water, and any alcohols formed are, at least essentially, evaporated away during the curing.

According to a one embodiment, the liquid medium used in the present invention is an aqueous medium, more preferably water. Preferably at least 70 wt. %, more preferably at least 90 wt. %, suitably at least 99 wt. %, more suitably 100 wt. % of the liquid medium is water. Thus, according to a preferred embodiment only water is used as a liquid medium, wherein the coating composition of the present invention comprises an alkoxysilane component and water as a liquid medium, i.e. as a solvent.

According to one embodiment, the liquid medium other than water can be selected from the group of alcohols, ketones, aldehydes, esters, glycol ether esters, glycol ethers, acetates, or some other organic solvent. The liquid medium can comprise for example ethanol, isopropanol, 2,2,4-trimetyyli-1,3-pentaanidiolimonoisobutyraatti, ethylacetoacetate, methyl ethyl ketone, propylene glycol methyl ether, propylene glycol monomethyl ether acetate, ethyl lactate or similar or any mixture thereof. Typically, optional solvent or solvents other than water are used in small amounts. According to one embodiment 1-30 wt. %, preferably 1-20 wt. %, more preferably 1-10 wt. %, of the liquid medium is other than water. Other liquid medium than water can be used to improve the miscibility of silane and water and to improve coating wettability by lowering the surface tension of coating.

According to one embodiment, the total liquid medium content of the coating composition is 50 to 99.9 wt. %, preferably 70 to 99 wt. %, for example 95 to 95.5 wt. %, of the weight of the total coating composition.

The properties, such as molecular weight, of the forming alkoxysiloxanes of the alkoxysilane component can be controlled by the hydrolyzation and condensation conditions. By varying the conditions, different structures, such as linear, more branched and branched structures, are formed. The condensation degree of the siloxanes can also be adjusted to an appropriate level.

According to one embodiment pH and temperature conditions can be used to affect the properties of the forming coating composition. Generally, alkaline conditions favor condensation over hydrolysis. By changing the pH conditions and temperature, it is possible to modify the polysiloxane compound structure and its reactivity. For example, more OH-groups can be introduced into the structure to increase the reactivity of the compound.

Thus, according to one embodiment, a catalyst can be used in the coating composition. The commonly used catalysts can be divided into acidic catalysts, basic catalysts and neutral catalysts. As stated above, different catalysts have different effects on the hydrolysis and polymerization rates of the alkoxysilane, which gives different final polymer properties.

When the basic catalyst is added, the condensation processes are quicker compared to using acidic or neutral catalyst. According to one embodiment, it is also possible to add a mixed catalyst such as an acidic catalyst ($HNO_3$) and a basic catalyst ($NH_4OH$). Generally, the acidic catalysts have higher hydrolysis efficiency, while the basic catalysts have a higher polymerization rate.

With different alkoxysilanes, and different catalysts, there are various possibilities for formulation of final material.

Thus, according to one embodiment the coating composition further comprises a catalyst, preferably being an acid, in particular an organic acid, especially a monomeric organic acid. According to one embodiment the organic acid is multifunctional, such as difunctional, whereby it can react from its both ends with the silane monomers/the polysiloxane forming in the condensation reaction.

According to one embodiment, the organic acid monomers react with the monomers corresponding to the polysiloxane polymer, and thus becomes part of the formed polysiloxane.

According to one embodiment, the coating composition is formed in the presence of an acid selected from the group of inorganic acids, comprising nitric acid, hydrochloric acid, sulfuric acid, phosphoric acid and boric acid, or from the group of organic acids, comprising lactic acid, acetic acid, formic acid, citric acid, oxalic acid, uric acid, itaconic acid, fumaric acid, succinic acid, biosuccinic acid (succinic acid made from biomass resources), gluconic acid, glutamic acid, malic acid, maleic acid, 2,5-furan dicarboxylic acid, 3-Hydroxypropionic acid, glucaric acid, aspartic acid, levulinic acid, adipic acid, sebacic acid, malonic acid, DL-malic acid, citraconic acid, L-(+)-tartaric acid, glutaric acid, pimelic acid, suberic acid, azelaic acid and combinations thereof.

According to a preferred embodiment the optional organic acid is levulinic acid, succinic acid, malic acid, maleic acid or a combination thereof.

Thus, one or more organic acids can be used at the same time. According to one embodiment, at least one organic acid is multifunctional, preferably difunctional, such as oxalic acid, malonic acid, succinic acid, DL-malic acid, fumaric acid, maleic acid, citraconic acid, itaconic acid, L-(+)-tartaric acid, glutaric acid, adipic acid, pimelic acid, suberic acid or azelaic acid. According to another embodiment at least two, for example 2 or 4 organics acids are difunctional. According to a further embodiment, the difunctional acid or difunctional acids are used in combination with one or more monofunctional acids.

According to one embodiment, the organic acid has a chain length of C1 to C10, preferably C4 to C6. The length of the organic acid can be used to affect the end product since preferably the organic acid reacts with the silane monomers and becomes part of the formed siloxane and thus part of the polysiloxane modified polyester composition. Length of the organic acid in the final composition especially affects the wear resistance of the composition, longer organic acid, in certain limits, typically provides better adhesion and wear resistance as well as coating liquid stability.

Thus, according to one embodiment, the alkoxysilane monomers are hydrolyzed with an aqueous acid solution, wherein the acid is preferably an organic acid. The content of the acid in the aqueous acid solution is typically in the range of 0.005 to 5 mol %, for example 1 mol-%, of the aqueous acid solution.

According to one embodiment at least 50 mol-%, for example at least 60 mol-%, preferably at least 75 mol-%, of the organic acids are difunctional.

Thus, according to a preferred embodiment, the silanes are hydrolyzed with an aqueous organic acid solution, wherein the organic acid is at least mainly difunctional organic acid, such as succinic acid, optionally combined with other organic acid, such as monofunctional organic acid, as an auxiliary acid.

According to another embodiment, the optional catalyst can also be added after the alkoxysilane monomers and the liquid medium, preferably water, are mixed, i.e. after the hydrolyzation and condensation polymerization has occurred, wherein the catalyst is acting only in the curing phase by catalyzing the reactions of the coating composition with the glass and between siloxanes of the coating composition.

According to a further embodiment, the coating composition may further comprise an additive. Additives can be used to overcome some possible disadvantages of alkoxysilanes, such as surface cracking and uneven surface caused by the pore capillary pressure differences and curved surface formation during drying process. Additives can also be used to adjust the surface conditions of the coated surface, such as low friction and release properties especially concerning adhesion of labels. However, already the alkoxysilane of the present invention as such should provide a suitable slipperiness for the surface of the glass article According to one embodiment additives providing improved properties, such as pigment stabilization, defoaming, improved surface properties and rheology control in aqueous, solvent-borne and solvent-free formulation, are added to the coating composition.

According to a preferred embodiment, additives used in the present invention are silicon-containing additives, especially silicon-containing surface additives, but also other additives can be used. Preferably, the additive is a polyether-modified polydimethylsiloxane, polyethylene glycol sorbitan monolaurate, non-ionic surfactant or an organically modified polysiloxane, or a combination thereof.

According to one embodiment, also other additives can be used, for example metalloxanes, such as aluminate, titanate and zirconate.

According to one embodiment, the optional additives can be added to the coating composition at any point of producing it. According to a preferred embodiment, the additives are further added into the mixture of alkoxysilane component and liquid medium.

The glass article of the present invention is not limited in any way. It can be any glass article, such as a glass container or any other piece of glass having any shape. The glass article, such as a container, can be open or closed as well as hollow or solid. The glass article can be for example a bottle.

The thickness of the glass article is not limited any way. According to one embodiment, the thickness of the glass article is at least 0.2 mm, preferably at least 0.5 mm, for example 0.5 to 5 mm.

According to one embodiment the glass article is made of natural and abundant raw material, such as sand, soda ash, limestone, or any mixture thereof, that is melted at very high temperature to form glass.

According to one embodiment the glass article is made of inorganic silica-based glass, such as soda-lime-silica.

Thus, the surface of the glass article of the present invention can be any glass surface, also a laminate having glass on its surface. The surface of the glass can also have any shape, it can for example be planar or curved. The surface can be flat or uneven and it can also be smooth, rough or crumbly According to one embodiment the present method can be used to coat any surface of the glass article. In the case of a glass article having both interior and exterior, the coating can be applied either to an exterior or interior surface of the glass article, or both. The method of the present invention is especially suitable for coating exterior surfaces of glass articles. Exterior surfaces of glass articles are more often prone to mechanical stress thus needing more protection.

Thus, according to one embodiment the method of the present invention for forming a siloxane coating on a glass article comprises the steps of
  providing a coating composition comprising an alkoxysilane component and an aqueous medium,
  applying a coating composition on the surface of the glass article, and
  curing the coating composition to form the siloxane coating on the glass article, wherein the alkoxysilane concentration of the coating composition is 0.1 to 30 wt. % and the concentration of the aqueous medium is at least 70 wt. %.

According to a further embodiment, the coating composition of the present invention is prepared by stirring alkoxysilane monomers and a liquid medium, preferably aqueous medium, more preferably water, especially deionized water, until they are homogeneously mixed. Typically, the mixing is performed at room temperature for example for more than 1 hour, preferably more than 6 hours, for example for 24 hours.

According to a preferred embodiment, the liquid medium, preferably water, is added in at least two parts, for example in two or three parts. The liquid medium can also be added in one part. According to one embodiment, first for example half of the liquid medium is added and mixed with alkoxysilane monomers. Finally, the other half of the liquid medium is added and the mixture is stirred.

If more than one different alkoxysilane monomers are used, those can be combined and mixed with each other prior to adding other components of the coating composition. According to another embodiment, two or more separate mixtures of alkoxysilane monomer and liquid medium can be produced, which are then mixed with each other prior to applying on the surface of the glass article and/or prior to adding possible other components of the coating composition to the mixture. According to a third embodiment, a different alkoxysilane can be added to the mixture of first alkoxysilane and liquid medium as such without any pre-treatment with a liquid medium. The structure of the alkoxysilane component, i.e. forming of dimers, trimers and polysiloxanes, in the coating composition can be affected by these alternatives.

According to one embodiment, an additive and/or a catalyst, preferably an acid, is optionally further added in to the coating composition. According to one embodiment, such other components are added into the mixture of alkoxysilane component and liquid medium, which is preferably produced by properly mixing alkoxysilane monomers and liquid medium with each other, for example by stirring for 24 hours. According to another embodiment an additive and/or catalyst can already be added into the mixture of alkoxysilane monomers and/or into a liquid medium.

According to one embodiment, the coating composition of the present invention has a dynamic viscosity of 0.2 to 50 mPas (20° C.), preferably 0.4 to 10 mPas (20° C.), more preferably 0.6 to 1.2 mPas (20° C.), determined by a rheometer at a shear rate of $2.5\ s^{-1}$.

The obtained coating composition of the present invention is then applied on the surface of the glass article. In particular, the coating composition is applied on the exterior surface of the glass article. According to a preferred embodiment, the glass article to be coated has a temperature between 60 and 200° C., preferably between 90 and 130° C., during coating.

This is the typical temperature of the glass articles after annealing and when treated with cold-end coating. Thus, the coating composition of the present invention is preferably applied on the glass article instead of conventional cold-end coating.

The coating composition can be applied on the glass article by any known method, such as spray coating, brushing, dip coating, spin coating or curtain coating, preferably by spray coating in traditional cold-end coating hood.

Once the coating composition is applied on the glass article it is cured to form the siloxane coating on the glass article. The curing occurs under the influence of heat of the glass article, i.e. a separate curing step is not needed. Thus, the method of the present invention provides a single step method in terms that hot-end coating is avoided, but also in terms that the coating and curing of the coating composition are preferably performed in a single step, wherein also a separate curing step is not needed.

Alkoxysilanes of the coating composition has undergone initial hydrolysis and some oligomerization prior to interacting with glass article. During curing, the hydrolyzed coating composition may interact with glass surfaces through hydrogen bonding with the glass-surface hydroxyl groups. Condensation of these initial surface structures generates siloxane bonds to the glass surface. Also lateral polymerization occurs directly between neighboring particles forming protective crosslinked siloxane net structure on glass surface.

Thus, it has been surprisingly found in the present invention that the coating composition of the present invention can be cured on the surface of a glass article without a separate curing step since the composition is cured by the heat of the glass article coming from the annealing. Thus, there is no need for extra curing in an oven for example. Further, the curing of the present invention differs from traditional curing in an oven in that in the present invention the composition is preferably cured by the heat conducted from the glass, not by an external heat, thus being process friendly and energy efficient.

Thus, according to a preferred embodiment, the method of the present invention only includes one coating step, i.e. applying one coating layer in a single coating step is enough to provide the desired properties for the glass article. Thus, the present invention enables replacing conventional hot-end coating and cold-end coating with a single coating composition and with a single coating step.

Preferably, the method comprises only a cold-end coating of the glass article, especially a single layer cold-end coating. According to one embodiment, the coating of the present invention is applied on the surface of the glass article just after annealing of the glass article, i.e. as a replacement of a typical cold-end coating known in the art.

In one embodiment, the siloxane coating on the surface of the glass article comprises a polysiloxane having a molecular weight ($M_W$) of 2500-2,500,000 g/mol, for example 5000 to 1,000,000 g/mol, in particular 10,000 to 500,000 g/mol.

The present invention also relates to a glass article coated by the method of the present invention. According to a preferred embodiment, the glass article of the present invention only comprises single coating layer providing the required properties, such as strengthening of the glass structure.

In addition, the present invention relates to the use of the glass article of the present invention. Especially, the glass article of the present invention may be used as any packing material, for example as a beverage bottle.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The following non-limiting examples are intended merely to illustrate the advantages obtained with the embodiments of the present invention.

EXAMPLES

Example 1

Preparation of Mixture 1 (Mixture of Alkoxysilane Component and Water)

12.5 g of triethoxymethylsilane (MTEOS) and 12.5 g of trimethoxymethylsilane (MTMS) were mixed in a baker. Then 500 g of deionized water was added to the mixture and the mixture was stirred at room temperature for 24 hours. Finally, additional 500 g of deionized water was added, and the mixture was stirred for 4 hours at room temperature.

Preparation of Coating Composition 1

To prepare the final coating composition, 0.2 g of polyether-modified polydimethylsiloxane (BYK333) was added to 20 g of Mixture 1 and the solution was stirred for 4 hours at room temperature. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 2

Preparation of Coating Composition 2

To prepare the final coating composition, 0.30 g of polyether-modified polydimethylsiloxane (BYK307) was added to 20 g of Mixture 1 of Example 1 and the solution was stirred for 4 hours at room temperature. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 3

Preparation of Coating Composition 3

To prepare the final coating composition, 0.2 g of polyether-modified polydimethylsiloxane (BYK381) was added to 20 g of Mixture 1 of Example 1 and the solution was stirred for 4 hours at room temperature. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 4

Preparation of Coating Composition 4

To prepare the final coating composition, 0.2 g of polyether-modified polydimethylsiloxane (BYK332) was added to 20 g of Mixture 1 of Example 1 and the solution was stirred for 4 hours at room temperature. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 5

Preparation of Coating Composition 5

To prepare the final coating composition, 0.2 g of organically modified polysiloxane (ADD3231) was added to 20 g of Mixture 1 of Example 1 and the solution was stirred for 4 hours at room temperature. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 6

Preparation of Coating Composition 6

To prepare the final coating composition, 0.2 g of non-ionic surfactant (Tergitol 15-S-15) was added to 20 g of Mixture 1 of Example 1 and the solution was stirred for 4 hours at room temperature. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 7

Preparation of Coating Composition 7

To prepare the final coating composition 0.15 g of 3-glycidoxypropylmethyldiethoxysilane, 1 g of nitric acid (0.01 M) and 0.11 g of polyether-modified polydimethylsiloxane (BYK333) was added to 11 g of Mixture 1 of Example 1 and the solution was stirred for 8 hours at room temperature. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 8

Preparation of Coating Composition 8

To prepare the final coating composition 0.50 g of 3-glycidoxypropylmethyldiethoxysilane, 1.2 g of aqueous levulinic acid solution (1 wt. %) and 0.11 g of seed oil surfactant (ECOSURF SA-9) was added to 11 g of Mixture 1 of Example 1 and the solution was stirred for 8 hours at room temperature. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 9

Preparation of Coating Composition 9

To prepare the final coating composition 0.25 g of 3-glycidoxypropylmethyldiethoxysilane, 1.8 g of aqueous maleic acid solution (0.5 wt. %) and 0.25 g of polyether-modified polydimethylsiloxane (BYK307) was added to 11 g of Mixture 1 of Example 1 and the solution was stirred. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 10

Preparation of Coating Composition 10

To prepare the final coating composition 0.25 g of epoxy-functional polydimethylsiloxane 1 g of nitric acid (0.01 M), 0.24 g of vinyltrimethylsilane (Vinyl-TMS) and 0.11 g of polyether-modified polydimethylsiloxane (BYK333) was added to 11 g of Mixture 1 of Example 1 and the solution was stirred. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 11

Preparation of Coating Composition 11

To prepare the final coating composition 0.25 g of epoxy-functional polydimethylsiloxane, 1 g of aqueous biosuccinic acid solution (1.3 wt. %), 0.24 g of vinyltrimethylsilane (Vinyl-TMS) and 0.11 g of polyether-modified polydimethylsiloxane (BYK307) was added to 11 g of Mixture 1 of Example 1 and the solution was stirred. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 12

Preparation of Coating Composition 12

10 g of triethoxymethylsilane (MTEOS) was added to 20 g of acetic acid solution (pH 4.5). The reaction mixture was stirred for 4 hours and then 595 g of deionized water was added. The solution was mixed for 1 hour at 60° C. Next, 3.125 g of polyethylene glycol sorbitan monolaurate (Tween20) was added to the solution. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 13

Preparation of Coating Composition 13

2.2 g of triethoxymethylsilane (MTEOS) and 14.7 g of ethoxytrimethylsilane (ETMS) was mixed. Then 1060 g of deionized water was added and the solution was mixed for 48 hours. Next, 0.546 g of polyether-modified polydimethylsiloxane (BYK3332) and 0.564 g of another polyether-modified polydimethylsiloxane (BYK 333) was added. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 14

Preparation of Coating Composition 14

4 g dimethyldiethoxysilane of and 2 g of ethoxytrimethylsilane (ETMS) was mixed. Then 125 g of deionized water was added and the solution was mixed for 48 hours. 2.1 g of polymethylhydroxysilane was added. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 15

Preparation of Coating Composition 15

25 g of phenyltriethoxysilane and 1.3 g of ethoxytrimethylsilane (ETMS) was mixed. Then 147 g of deionized water was added and the solution was mixed for 2 hours at 75° C. 1.7 g of polyethylene glycol sorbitan monolaurate (Tween20) was added and mixed for 8 hours at room temperature. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 16

Preparation of Coating Composition 16

3.5 g of ethoxytrimethylsilane (ETMS) and 145 g of deionized water was mixed for 48 hours. Next, 1.3 g of polyether-modified polydimethylsiloxane (BYK332) was added. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 17

Preparation of Coating Composition 17

2 g of triethoxymethylsilane (MTEOS) and 2 g of ethoxytrimethylsilane (ETMS) was mixed. Then 65 g of deionized water and 1.7 g of aqueous levulinic acid solution (2.1 wt. %) was added and the solution was mixed for 48 hours. Next, 1.3 g of polyether-modified polydimethylsiloxane (BYK3672) was added. This solution was used to coat hot (90 to 130° C.) glass bottles by spray coating, i.e. the solution was sprayed onto the surface of the hot glass bottle, wherein the coating composition was cured on the surface of the glass by the heat of the bottle.

Example 18

Preparation of Coating Composition 18

1.7 g of triethoxymethylsilane (MTEOS) and 3.5 g of ethoxytrimethylsilane (ETMS) was mixed. Then 110 g of deionized water and 1.6 g of aqueous levulinic acid solution (1 wt. %) was added and the solution was mixed for 48 hours. Next, 1.3 g of non-ionic surfactant (Tergitol 15-S-7) was added. This solution was used to coat hot (90 to 130° C.) glass bottles by spray coating, i.e. the solution was sprayed onto the surface of the hot glass bottle, wherein the coating composition was cured on the surface of the glass by the heat of the bottle.

INDUSTRIAL APPLICABILITY

The present method can be used to form a siloxane coating on a glass article, and generally for replacement of conventional methods of coating glass articles.

In particular, the present method is useful in coating glass articles, such as glass bottles, with a single layer composition in a single step coating process. The coated glass article of the present invention can be used in versatile uses, such as a drinking container.

Thus, glass articles as described herein find use as glass containers, in particular in the packaging industry.

CITATION LIST

Patent Literature

WO2017100512A1
WO2012166221A1
WO2014105350A2

The invention claimed is:

1. A method for forming a siloxane coating on a glass article, comprising the steps of
    providing a coating composition comprising an alkoxysilane component and an aqueous medium,
    applying the coating composition on the surface of the glass article, and
    curing the coating composition to form the siloxane coating on the glass article,
wherein the alkoxysilane concentration of the coating composition is 0.1 to 30 wt. % and at least 70 wt. % of the aqueous medium is water,
wherein the coating composition further comprises an aqueous acid solution comprising one or more organic acids,
wherein at least 50 mol-% of the one or more organic acids is difunctional, and
wherein the coating composition is cured by the heat of the glass article being coated.

2. The method according to claim 1, wherein 100 wt. % of the aqueous medium is water.

3. The method according to claim 1, wherein the alkoxysilane component is a polysiloxane mixture obtained by hydrolyzation and condensation polymerization of corresponding alkoxysilane monomers.

4. The method according to claim 3, wherein the alkoxysilane monomers are silanes selected from the group consisting of trimethoxymethylsilane (MTEOS), trimethoxymethylsilane (MTMS), ethoxytrimethylsilane (ETMS), 1,2-bis(triethoxysilyl)ethane (BTESE), tetraethyl ortosilicate (TEOS), triethoxyphenylsilane (PTMS), vinyltrimethylsilane (Vinyl-TMS), and mixtures thereof.

5. The method according to claim 3, wherein the coating composition is prepared by stirring the alkoxysilane monomers and the aqueous medium until they are homogeneously mixed.

6. The method according to claim 1, wherein a silicon additive is further added into the mixture of the alkoxysilane component and the aqueous medium.

7. The method according to claim 6, wherein the silicon additive comprises a polyether-modified polydimethylsiloxane, an organically modified polysiloxane, a non-ionic surfactant, or a combination thereof.

8. The method according to claim 1, wherein the concentration of the one or more organic acids is 0.005 to 5 mol-% of the aqueous acid solution.

9. The method according to claim 1, wherein the one or more organic acids is selected from the group consisting of levulinic acid, succinic acid, maleic acid, and combinations thereof.

10. The method according to claim 1, wherein the coating composition is applied on an exterior surface of the glass article.

11. The method according to claim 10, wherein the glass article to be coated has a temperature between 60 and 200° C. during the applying of the coating composition.

12. The method according to claim 1, wherein the coating composition is applied and cured on the surface of the glass article in a single step.

13. The method according to claim 1, wherein the coating composition is applied by spray coating.

14. The method according to claim 1, comprising only a cold-end coating of the glass article, wherein the coating composition is applied on the surface of the glass article just after annealing of the glass article.

15. The method according to claim 1, wherein all of the one or more organic acids are difunctional.

16. The method according to claim 1, wherein the concentration of the one or more organic acids is 0.005 to 5 mol-% of the alkoxysilane component.

17. The method according to claim 1, wherein the curing is performed without an external heat source.

18. The method according to claim 1, wherein the curing is performed without an external curing source.

19. A method for forming a siloxane coating on a glass article, comprising the steps of
providing a coating composition comprising an alkoxysilane component and an aqueous medium,
applying the coating composition on the surface of the glass article, and
curing the coating composition to form the siloxane coating on the glass article,
wherein the alkoxysilane concentration of the coating composition is 0.1 to 30 wt. % and at least 70 wt. % of the aqueous medium is water, and
wherein the coating composition is cured by the heat of the glass article being coated.

20. The method according to claim 19, wherein the curing is performed without an external curing source.

* * * * *